United States Patent [19]
Diep

[11] Patent Number: 5,489,420
[45] Date of Patent: Feb. 6, 1996

[54] NITROGEN OXIDES REDUCING AGENT AND A PHOSPHATE

[75] Inventor: Daniel V. Diep, Aurora, Ill.

[73] Assignee: Nalco Fuel Tech, Naperville, Ill.

[21] Appl. No.: 209,541

[22] Filed: Mar. 10, 1994

[51] Int. Cl.$^6$ .................................................. C01B 21/04
[52] U.S. Cl. ........................................ 423/235; 423/239.1
[58] Field of Search ................... 423/235, 239.1

[56] References Cited

U.S. PATENT DOCUMENTS

| | | | |
|---|---|---|---|
| 3,900,554 | 8/1975 | Lyon | 423/235 |
| 4,208,386 | 6/1980 | Arand et al. | 423/235 |
| 4,325,924 | 4/1982 | Arand et al. | 423/235 |
| 4,756,890 | 7/1988 | Tang et al. | 423/235 |
| 4,777,024 | 10/1988 | Epperly et al. | 423/235 |
| 4,780,289 | 10/1988 | Epperly et al. | 423/235 |
| 4,842,834 | 6/1989 | Burton | 423/235 |
| 4,985,218 | 1/1991 | DeVita | 423/235 |
| 4,992,249 | 2/1991 | Bowers | 423/235 |
| 4,997,631 | 3/1991 | Hofmann et al. | 423/235 |

FOREIGN PATENT DOCUMENTS

| | | |
|---|---|---|
| 4930147 | 3/1974 | Japan. |
| 9202291 | 2/1992 | WIPO. |

OTHER PUBLICATIONS

Translation of 4930147 (abstract only).

Primary Examiner—Gary P. Straub
Assistant Examiner—Thomas G. Dunn, Jr.
Attorney, Agent, or Firm—St. Onge Steward Johnston & Reens

[57] ABSTRACT

Processes and compositions enable selective noncatalytic reduction (SNCR) in the gas phase at temperatures above 950° C. to reduce the environmental damage caused by $NO_x$ and related emissions. By utilizing a nitrogenous $NO_x$-reducing agent, such as urea, in combination with a phosphate at a ratio of nitrogen in the $NO_x$-reducing agent to phosphorous of less than about 50:1, $NO_x$ reduction is improved and carbon monoxide, nitrous oxide and ammonia are maintained at low levels.

11 Claims, 1 Drawing Sheet

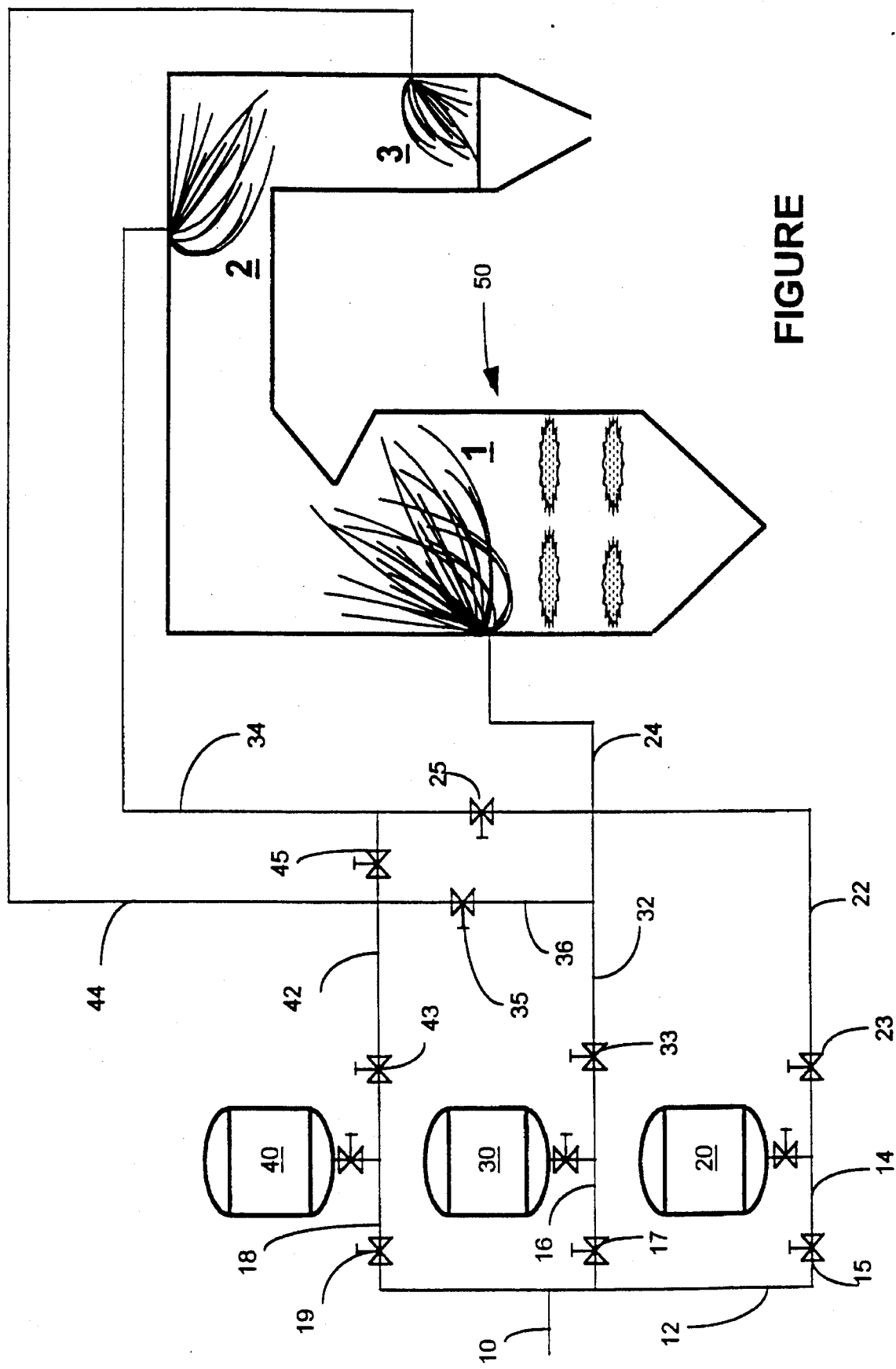
FIGURE

NITROGEN OXIDES REDUCING AGENT AND A PHOSPHATE

TECHNICAL FIELD

The invention relates to reducing the environmental damage caused by large-scale combustion, and provides both improved processes and improved compositions for achieving this, especially in the field of $NO_x$ reduction by selective noncatalytic reduction (SNCR) at high temperatures.

Carbonaceous materials, including the typical hydrocarbon fuels such as coal, oil and gas, as well as refuse, are burned in increasing amounts each year. At the high temperatures (e.g., 1000° to 1700° C.) normally encountered in large-scale combustors, nitrogen oxides ($NO_x$) formation is high because the conditions favor formation of free radicals of oxygen and nitrogen and their chemical combination as nitrogen oxides.

In order to reduce the formation of $NO_x$, both prevention and post-combustion measures (often called primary and secondary measures) have been employed. Prevention measures are those which modify combustion itself and may involve using an excess of air or fuel or a combination of both in staged combustion. However, when such measures are used alone, undesirable levels of carbon monoxide and nitrous oxide can result. Moreover, combustion modifications tend to be capital intensive.

A number of economically-attractive, post-combustion measures have been developed which enable combustion to take place under efficient conditions, with resultant $NO_x$ generation, but then reduce the $NO_x$ by conversion into other compounds which can either be emitted or eliminated from the flue gas. Of these, selective gas phase reactions—both catalytic (SCR) and non-catalytic (SNCR)—are advantageous because they permit reduction of $NO_x$ while using relatively low levels of chemical reducing agents. The SNCR procedures are especially effective and economical.

The attainment of consistent, high reductions in $NO_x$ with SNCR procedures is a matter of considerable engineering and chemistry. These reactions occur in the gas phase and typically involve $NO_x$ levels of 20 to 1500 parts per million by volume ($ppm_v$) and a $NO_x$-reducing agent, such as urea or ammonia, at from about one to three times the amount stoichiometrically required. The reactions require mating of the reactive materials in high dilution in the gas phase. Moreover, the "temperature window" for effective reaction is discrete. Temperatures which are too high can result in oxidation of the $NO_x$-reducing agent, and those too low can result in ammonia slip and the production of $N_2O$ and carbon monoxide.

In some installations, the ability to introduce $NO_x$-reducing agents into the combustion gases at the optimal temperature is restricted by heat exchange devices or the manner of construction. These restrictions can influence the location of injectors—often creating undesirable design choices such as injection of chemical at a higher-than-optimum temperature or a lower-than-optimum temperature. It would be desirable to have a composition which was especially adapted to high-temperature operations.

There remains a need to widen the temperature window for selective noncatalytic $NO_x$ reduction to enable more effective solutions to the complex problems presented, especially in retrofitting operating installations.

BACKGROUND ART

Prominent among the selective non-catalytic reduction (SNCR) processes are those disclosed by Lyon in U.S. Pat. No. 3,900,554 and by Arand et al. in U.S. Pat. Nos. 4,208,386 and 4,325,924. Briefly, these patents disclose that ammonia (Lyon) and urea (Arand et al.) can be injected into hot combustion gases to selectively react with $NO_x$ and reduce it to diatomic nitrogen and water.

The SNCR process described by Lyon in U.S. Pat. No. 3,900,554 reduces the concentration of nitrogen monoxide (NO) by contacting combustion gases with ammonia or certain ammonia precursors. Gas-phase reactants or aqueous solutions can be introduced into oxygen-rich waste gas for selective reaction with the nitrogen monoxide at a temperature in the range of from 870° to 1100° C. The limiting lower temperature of the window can be reduced by the addition of certain substances. However, there is no method or means disclosed to protect the ammonia where the temperature is too high. At temperatures above about 1050° C., some of the ammonia will be oxidized to form additional NO.

Arand et al. disclose in U.S. Pat. No. 4,208,386, that urea can be added alone or in solution to oxygen-rich effluents in a temperature range from about 700° to about 1100° C. Again, here, as with the Lyon process, distribution is critical to selective reduction and no solution is found to the problem of high temperature operation.

In U.S. Pat. No. 4,325,924, Arand et al. describe an SNCR process utilizing urea in fuel-rich combustion effluents. They report that under these conditions, the reaction will still reduce $NO_x$ at temperatures within the range of from about 1040° to about 1650° C. However, fuel-rich conditions are not economical and can result in high levels of carbon monoxide.

More recently, Bowers disclosed in U.S. Pat. No. 4,992,249, that if droplet size is increased and urea concentration is decreased, good results can be achieved in oxygen-rich effluents at higher temperatures than disclosed by Arand et al. While the use of water for dilution can provide limited protection for an active agent from the intense heat, some droplets tend to be too small and evaporate too rapidly and some tend to be too large and can impact equipment. Both deviations cause reactions to occur under less than optimum conditions. And, both can result in the production and release to the atmosphere of additional pollutants—high temperatures can cause additional $NO_x$ generation, and low temperatures can generate ammonia, $N_2O$ and carbon monoxide.

There is a present need for improved processes and compositions which are effective under oxygen-rich conditions and at highly-elevated temperatures to reduce nitrogen oxides while simultaneously maintaining low levels of secondary pollutants.

DISCLOSURE OF INVENTION

It is an object of the invention to provide greater flexibility in the design of SNCR $NO_x$-reduction systems.

It is an object of the invention to enable $NO_x$ reduction at temperatures sufficiently elevated that the production of carbon monoxide and nitrous oxide are maintained at low levels.

It is an object of the invention to improve the introduction and utilization of pollutant-reducing chemicals in hot combustion effluents.

It is another object of the invention to provide improved $NO_x$-reducing agents for use at high temperatures.

Another object is to mitigate destruction of $NO_x$-reducing agents and the production of $NO_x$ which are associated with SNCR processes when operated at or near the upper end of the temperature window.

These and other objects are achieved by the present invention which provides improved processes and compositions.

In one aspect, the invention provides a process for reducing the concentration of $NO_x$ in an oxygen-rich gas stream at temperatures above about 950° C., comprising: introducing both a nitrogenous $NO_x$-reducing agent and a phosphate into the gas stream, wherein the phosphate is present in sufficient quantity to decrease the oxidation of the $NO_x$-reducing agent. Both the $NO_x$-reducing agent and the phosphate are preferably introduced as aqueous solutions which are preferably injected as droplets to enable good distribution within the gas stream.

The $NO_x$-reducing agent and the phosphate can be introduced separately or as a common solution. The $NO_x$-reducing agent is preferably introduced at a molar ratio of nitrogen in it to the nitrogen in the gas stream as $NO_x$ (i.e., normalized stoichiometric ratio—NSR) of from about 0.8 to about 5, more typically in the range of from about 1 to about 3. The phosphate is preferably introduced at a molar ratio of nitrogen (in the $NO_x$-reducing agent) to phosphorous of from about 50:1 to about 1:2, more typically from about 35:1 to about 4:1.

BRIEF DESCRIPTION OF THE DRAWING

The invention will be better understood and its advantages will become more apparent when the following detailed description is read in conjunction with the accompanying drawing, in which:

The FIGURE schematically represents one process scheme according to the invention.

BEST MODE FOR CARRYING OUT THE INVENTION $NO_x$-containing effluents are produced by a variety of sources including large industrial and utility boilers, circulating fluidized bed boilers, and gas turbines. It will be understood, that although written in terms of the reduction of nitrogen oxides in effluents resulting from combusting carbonaceous fuels, the invention is applicable in any high-temperature gas containing nitrogen oxides that can be treated by selective gas-phase reaction.

The invention is effective in increasing the typical upper limit of the temperature window of nitrogenous $NO_x$-reducing agents such as urea. Effective gas stream temperatures for treatment according to the invention will typically be greater than about 800° C., and more typically fall within the range of from about 950° to about 1400° C. and higher. It is an advantage of the invention that combustion gases with temperatures within the range of from about 1100° to about 1250° C., that cannot usually be handled by prior art procedures, can be effectively processed with the addition of an effective amount of a phosphate to the $NO_x$-reducing agent.

As set forth in the references identified above, the known processes involve preparing a treatment composition (typically as an aqueous solution), transporting the composition to a gas stream (e.g., hot combustion gases, alternatively called combustion effluent) through conduits effective for this purpose, and introducing the composition into the gas stream at a concentration and at a rate effective to reduce $NO_x$ concentration under the conditions prevailing in the gas stream.

In most processes of this type, the treatment composition is introduced into the effluent by an injector which generally comprises a conduit, sometimes fitted at the tip with a nozzle, extending into an effluent gas stream. In some cases a portion of effluent or other gas is employed to help atomize and disperse the treatment composition. The spray or injection pattern is defined with precision, often with the aid of computer to assure good distribution and reaction. The present invention helps improve operation by permitting treatment at temperatures normally higher than optimum.

Apparatus of varying degrees of sophistication are known for introducing $NO_x$-reducing compositions into a high temperature environment. Some comprise coaxial, multitubular structures, such as those disclosed by Burton in U.S. Pat. No. 4,842,834, by DeVita in U.S. Pat. No. 4,985,218, and by Chawla et al. in WO 91/17814, the disclosures of each of which are incorporated herein by reference.

To maximize $NO_x$ reduction, the art has also developed systems which introduce chemicals in stages (U.S. Pat. No. 4,777,024 to Epperly et al.), and with variation in location of injection and chemical formulation as is necessary to meet the temperature and compositional variations in the gas stream being treated (U.S. Pat. No. 4,780,289 to Epperly et al.).

These processes are all improved by incorporating in the solution a phosphate in an amount sufficient to increase the effective upper limit of the temperature window for the $NO_x$-reducing agent of choice.

For the purposes of this description, all temperatures herein are measured using a suction pyrometer employing a k-type thermocouple. Droplet sizes are determined with a Malvern 2600 instrument, utilizing a Fraunhofer diffraction, laser-based system. And, unless otherwise indicated, all parts and percentages are based on the weight of the composition at the particular point of reference.

The FIGURE shows a representative multistage treatment in a large combustor. This figure shows the final mixing and introduction of three individual active components. These are shown as being stored in tanks 20, 30 and 40, which are associated with metering pumps (not shown) as well as suitable conduits, and valves to enable mixing in the manner called for by a controller (not shown) or manual operation. The temperature of effluent at the point of injection, the concentration of active component in the solution, and the size of the droplets in the dispersion, are selected to achieve reduction in nitrogen oxides while mitigating levels of other pollutants in the effluent.

One exemplary injection apparatus is described in the above-identified disclosure of Chawla et al. and is capable of supplying a $NO_x$-reducing agent comprised of one or more active components in a two-phase mixture of liquid and gaseous components. The liquid component of a two-phase mixture in the case of Chawla et al., Burton or DeVita injectors, or a single-phase, liquid component in the case of other nozzles not requiring a gas, typically comprises a solution having at least one agent effective in reducing $NO_x$ under the conditions of injection, and also usually includes various additives to protect the system against blockage.

The active $NO_x$-reducing agent, is desirably incorporated in the liquid phase. In one embodiment, a $NO_x$-reducing agent is introduced as an aqueous treatment solution, such as urea or other nitrogen-containing composition in water with one or more phosphates.

Various nitrogen-containing compositions, in their pure and typical commercial forms, contain nitrogen and hydrogen and will generate effective gas-phase agents (e.g., the amidozine radical, NH.) when introduced in aqueous solution and subjected to elevated temperatures. Among the prominent NH-containing compositions are those selected from the group consisting of ammonia, ammonia precursors, urea, urea precursors, urea hydrolysis products, products of reaction of urea with itself or other compositions, related compositions, and mixtures of these. Among these compounds are ammonium carbonate, ammonium bicarbonate, ammonium carbamate, ammonium formate, ammonium citrate, ammonium acetate, ammonium oxalate, other ammonium salts (inorganic and organic) particularly of organic acids, ammonium hydroxide, various stable amines, guanidine, guanidine carbonate, biguanide, guanylurea sulfate, melamine, dicyanimide, calcium cyanamide, biuret, 1,1'azobisformamide, methylol urea, methylol urea-urea, dimethyl urea, hexamethylenetetramine (HMTA), and mixtures of these.

Among these compositions, the hydrolysis products of urea are preferred for many installations and include ammonia, carbamates such as ammonium carbamate, ammonium carbonate, ammonium bicarbonate and other ammonia salts, various urea complexes and half ammonia salts. The exact form of some of these compounds is not known because the techniques employed to analyze them can affect their makeup. U.S. Pat. No. 4,997,631 to Hofmann et al. and PCT application WO 92/02291 to von Harpe et al., are incorporated herein by reference.

Among the suitable phosphates are phosphoric acid and its salts with sufficient water solubility and controllable pH to permit their efficient introduction in aqueous solution, including ammonium phosphates (e.g., in the $NH_3$-$P_2O_5$-$H_2O$ system), calcium phosphates (e.g., in the $CaO$-$P_2O_5$-$H_2O$ system), and the acid-form phosphates. One preferred class of phosphates includes those phosphates which have measurable flame retarding properties.

Exemplary of the ammonium phosphates are those in the $NH_3$-$P_2O_5$-$H_2O$ system, including: the monobasic salt, ammonium dihydrogen phosphate ($NH_4H_2PO_4$); the dibasic salt, diammonium hydrogen phosphate (($NH_4)_2HPO_4$); triammonium phosphate, ($NH_4)_3PO_4$; diammonium hydrogen phosphate trihydrate ($NH_4)_2HPO_4$·$3H_2O$; the hemibasic salts, ammonium hemiphosphate ($NH_4H(H_2PO_4)_2$) and ammonium hemiphosphate monohydrate ($NH_4H(H_2PO_4)_2$·$H_2O$); triammonium phosphate compound with bis(diammonium) phosphate (1:1), (($NH_4)_3PO_4$·$2(NH_4)_2HPO_4$); diammonium dihydrogen pyrophosphate (($NH_4)_2H_2P_2O_7$); triammonium hydrogen pyrophosphate (($NH_4)_3HP_2O_7$); triammonium hydrogen pyrophosphate monohydrate (($NH_4)_3HP_2O_7$·$H_2O$); tetraammonium pyrophosphate (($NH_4)_4P_2O_7$); tetraammonium pyrophosphate monohydrate (($NH_4)_4P_2O_7$·$H_2O$); and, ammonium polymetaphosphate (($NH_4PO_3)_n$).

Among the suitable calcium phosphates are those in the $CaO$-$P_2O_5$-$H_2O$ system, including: phosphoric acid, calcium salt (2:1), ($Ca(H_2PO_4)_2$); phosphoric acid, calcium salt hydrate (2:1:1), ($Ca(H_2PO_4)_2$·$H_2O$); phosphoric acid, calcium salt hydrate (2:1:2), ($Ca(H_2PO_4)_2$·$2H_2O$); calcium hydrogen phosphate ($CaHPO_4$); calcium hydrogen phosphate hemihydrate ($CaHPO_4$·$2H_2O$); calcium hydrogen phosphate dihydrate ($CaHPO_4$·$2H_2O$); alpha-tricalcium phosphate ($\alpha$-$Ca_3(PO_4)_2$); beta-tricalcium phosphate ($\beta$-$Ca_3(PO_4)_2$); hydroxyapatite $Ca_{10}(PO_4)_6(OH)_2$; octacalcium phosphate pentahydrate ($Ca_8H_2(PO_4)_6$·$5H_2O$); calcium dihydrogen pyrophosphate ($CaH_2P_2O_7$); and, calcium pyrophosphate ($Ca_2P_2O_7$).

Among the suitable acid phosphates, are: hydrogen hypophosphite (hypophosphorous acid), hydrogen phosphate (phosphorous acid), hydrogen phosphate (phosphoric acid), hydrogen diphosphate (pyrophosphoric acid), hydrogen triphosphate (triphosphoric acid), hydrogen tetraphosphate (tetraphosphoric acid), hydrogen trimetaphosphate (trimetaphosphoric acid), hydrogen tetrametaphosphate (tetrametaphosphoric acid), hydrogen hexametaphosphate (hexametaphosphoric acid), hydrogen octametaphosphate (octametaphosphoric acid), hydrogen imidodiphosphate (imododiphosphoric acid), hydrogen dimidotriphosphate (dimidotriphosphoric acid), cyclo-tri-μ-imidotris(dioxophosphate) (trimetaphosphimic acid), hydrogen diphosphate (Ill,V). (isohypophosphoric acid), hydrogenhypophosphate (hypophosphoric acid), and hydrogen peroxodiphosphate.

Referring again to the FIGURE, the various treatment solutions are mixed to include the $NO_x$-reducing composition, alone or in combination with low-temperature enhancer or phosphate, most appropriate for the range of temperatures expected to be encountered at its respective introduction into zone 1, 2, or 3. The concentration of the compositions for each point of introduction can be adjusted as desired by water from the common source shown as 10.

In the embodiment shown in the FIGURE, three zones of injection are provided at progressive spacing distances downstream of the combustion flame. The temperature decreases with successive levels moving first upward and to the right and downward in the FIGURE. As combustion proceeds, effluent rises upwardly in this drawing through the passage defined by the walls of combustor 50. There may also be other obstructions, such as banks of cooling tubes and the like, within the combustor which can dictate the area within the passage where chemical introduction must take place. Also, in some cases, the exact location of injection points cannot be chosen due to the need to cut through water-lined walls or tubes and other economic and operational factors. Accordingly, it is often necessary to introduce the treatment agent at temperatures which are too hot for urea or like agents.

Tank 20 in the FIGURE holds phosphate solution. Tank 30 holds a urea solution, and tank 40 holds a sugar solution as a low-temperature enhancer. Water is supplied from a common source 10 to header 12 from which it can be distributed for admixture with the solutions upon flow from the tanks 20, 30 and 40 via lines 14, 16, and 18, respectively. Valves 15, 17, and 19 control the supply of water to the solutions from the noted tanks. Lines 22, 32, and 42 and associated valves 23, 33, and 43, control the flow of chemical solutions from tanks 20, 30, and 40, respectively.

Line 22 and valve 23 direct phosphate solution to line 24 for injection into zone 1 of the combustor 50. The phosphate solution can be premixed with a $NO_x$-reducing agent such as urea or it can be maintained separate and admixed with a $NO_x$-reducing solution supplied from tank 30 via line 32 and valve 33. In the arrangement shown, it is also possible to supply urea alone or with the low-temperature enhancer to zone 1 to follow load under low-load conditions.

The solution of $NO_x$-reducing agent from tank 30 can be supplied to zone 2 via line 32 and valve 33 to line 34 and valve 35. Dilution water can be added as desired via line 16 and valve 17. To the extent required by load-following control, low-temperature enhancer can be supplied from tank 40 via line 42 and valves 43 and 45.

Zone 3 is supplied with low-temperature enhancer from tank 40 alone or in combination with $NO_x$-reducing agent from tank 30. At low loads, enhancers such as those disclosed for the purpose in U.S. Pat. No. 4,844,878 to Epperly et al., can be added via line 42 and valve 43 to line 44 to scrub ammonia and achieve further $NO_x$ reductions. Where the temperatures are suitable, e.g. from about 800° to about 900° C., urea or other $NO_x$-reducing agent can also be introduced via line 32 and valve 33 to line 44.

It is preferred that the solution of $NO_x$-reducing agent be dispersed from a nozzle to provide droplets having an average droplet size within the range of from about 5 to about 10,000 microns Sauter mean diameter, and a relative span of droplet sizes of less than about 5. Most preferably, the median droplet size will be within the range of from about 200 to 1000 microns. The term "relative span" refers to the distribution of droplet sizes—the lower the value, the more nearly the same they are.

Commonly-assigned U.S. patent application Ser. No. 07/770,857, entitled "Hardness Suppression In Urea Solutions", filed Oct. 3, 1991 by Dubin et al., discloses suitable scale control compositions which contain phosphates. That application does not, however, use significant levels of those materials as would be necessary to modify the effective temperature range for the $NO_x$-reducing agents disclosed.

The advantages of the present invention are additive to those of the above-referenced Dubin et al. application wherein it is disclosed that water hardness problems are exacerbated by the presence of urea and other NH-containing compositions.

The $NO_x$-reducing composition improved by the invention will typically be prepared and shipped as a concentrate which is diluted for use. Typically, these concentrates will contain about 25 to about 65% urea, from about 6% to about 16% of an effective phosphate salt, and about 0.05 to about 1.0% of an effective hardness-suppressing composition, more preferably from about 40 to about 55% urea (e.g., about 50%), from about 10% to about 14% of the phosphate, and from about 0.1 to about 0.75%, e.g., about 0.5%, of the hardness-suppressing composition. The urea and a separate additive package may be preblended to form this concentrate.

The noted concentrate can be diluted prior to injection as required to achieve a urea concentration effective under the injection conditions. Typically, dilution to concentrations of from 5 to 25% urea are effective. Lower concentrations (e.g., 1 to 5%) may be desired. Typically, the pH of the aqueous solution is above 5, and generally is within the range of from 7 to 11, e.g., 8 to 10. Accordingly, the dibasic ammonium phosphate, which tends to be mildly alkaline, is a preferred material.

The concentration of the $NO_x$-reducing agent injected into the effluent should be sufficient to obtain a reduction, preferably at least about 10%, of the nitrogen oxide concentration. In particular, the reducing agents are employed in total amounts sufficient to provide a molar ratio of reducing agent to baseline nitrogen oxide content (i.e., prior to treatment at that stage) of about 1:4 to about 5:1. The ratio is preferably within the range from 1:2 to 2:1, even more narrowly 2:3 to 6:5. In most situations this amount will be distributed jointly by a number of nozzles from a number of points as is illustrated in the FIGURE.

The $NO_x$-reducing agent and the phosphate can be introduced separately or as a common solution. The $NO_x$-reducing agent is preferably introduced at a molar ratio of nitrogen in it to the nitrogen in the gas stream (i.e., normalized stoichiometric ratio—NSR) of from about 0.8 to about 5, more typically in the range of from about 1 to about 3. The phosphate is preferably introduced at a molar ratio of nitrogen (in the $NO_x$-reducing agent) to phosphorous of from about 50:1 to about 1:2, more typically from about 35:1 to about 4:1.

The following examples are provided to further explain and illustrate the invention and some of its advantages, but are not to be taken as limiting in any regard. Unless otherwise indicated, all percentages are by weight.

EXAMPLE 1

A flame tube test chamber was fired with No. 2 fuel oil at a rate of 1.8 gallons per hour and sufficient air to burn the gas completely and yield in an excess oxygen of 2%. Baseline $NO_x$ was 295 ppm, and baseline CO and $NH_3$ concentrations (ppm) were both zero. Each of the above test solutions was sprayed into the flame tube at a location where the temperature of the combustion gases was about 1200° C. The droplet size was not measured, but the nozzle employed is known to produce droplets in range of from about 5 to about 500μ. The effluent gases were tested for each of the solutions tested, giving the following results:

| SAMPLE | NSR | $NO_x$ (ppm) | % RED. $NO_x$ | $N_2O$ (ppm) |
| --- | --- | --- | --- | --- |
| Baseline |  | 295 |  | 0 |
| Urea | 1 | 221 | 25 | 2 |
| $(NH_4)_2HPO_4$ | 1 | 236 | 20 | 3 |
| Urea | 2 | 198 | 33 | 4 |
| Ammonium polyphosphate | 2 | 163 | 45 | 7 |
| Urea + $NH_4H_2PO_4$ | 2 | 164 | 45 | 7 |
| Urea + $(NH_4)_2HPO_4$ | 2 | 162 | 45 | 7 |

EXAMPLE 2

This example also employs the flame tube operated as above, with the exception that the fuel feed rate was 1.4 gallons per hour, the baseline $NO_x$ was 74 ppm, and there was 8% excess oxygen. The effectiveness of various amounts of urea as a $NO_x$-reducing agent and variation of it with various ratios of it with dibasic ammonium phosphate ($(NH_4)_2HPO_4$) were examined as summarized in the table below. Each of the test solutions included urea as a $NO_x$-reducing agent and the hardness suppressing composition as in Example 1. The NSR values are based on the urea alone. The urea solution with an NSR of 1 contained 97% water. The other solutions were prepared with the same quantity of water but contained the additional solids.

The following table defines the test conditions for each sample in terms of the NSR (molar ratio of nitrogen in the urea added to the baseline $NO_x$) an N/P (molar ratio of nitrogen in the urea to phosphorous). The table also reports the results for the treatments in terms of $NO_x$, percent reduction of $NO_x$, and $N_2O$.

| SAMPLE | NSR | N/P | $NO_x$ (ppm) | % RED. $NO_x$ | $N_2O$ (ppm) |
| --- | --- | --- | --- | --- | --- |
| Baseline |  |  | 74 |  | 0 |
| Urea | 1 |  | 58 | 22 | 8 |
| Urea | 2 |  | 51 | 31 | 11 |
| Urea | 3 |  | 48 | 35 | 17 |
| Urea + $(NH_4)_2HPO_4$ | 2 | 34.7 | 42 | 43 | 12 |
| Urea + $(NH_4)_2HPO_4$ | 2 | 17.3 | 39 | 47 | 11 |
| Urea + $(NH_4)_2HPO_4$ | 2 | 8.7 | 47 | 36 | 12 |

EXAMPLE 3

This example summarizes tests done in the flame tube operated as in Example 2, except that the solutions were introduced closer to the burner where the gas temperature was about 1240° C., there was an excess of oxygen of 4%, and the phosphate in this case was monobasic ammonium phosphate.

| SAMPLE | NSR | N/P | $NO_x$ (ppm) | % RED. $NO_x$ | $N_2O$ (ppm) |
|---|---|---|---|---|---|
| Baseline | | | 245 | | 0 |
| Urea | 1 | | 220 | 10 | 2 |
| Urea | 1.3 | | 220 | 10 | 2 |
| Urea + $NH_4H_2PO_4$ | | 17.3 | 185 | 24 | 4 |

In addition to the results summarized in the table, it was also noted that there was no ammonia found in the effluent.

The above description is for the purpose of teaching the person of ordinary skill in the art how to practice the present invention, and it is not intended to detail all of those obvious modifications and variations of it which will become apparent to the skilled worker upon reading the description. It is intended, however, that all such obvious modifications and variations be included within the scope of the present invention which is defined by the following claims. For conciseness, several conventions have been employed with regard to listings of chemicals and ranges. The listings of chemical entities throughout this description are meant to be representative and are not intended to exclude equivalent materials, precursors or active species. Also, each of the ranges is intended to include, specifically, each integer, in the case of numerical ranges, and each species, in the case of chemical formulae, which is encompassed within the range. The claims are meant to cover the claimed components and steps in any sequence which is effective to meet the objectives there intended, unless the context specifically indicates the contrary.

I claim:

1. A process for reducing the concentration of $NO_x$ in an oxygen-rich gas stream by selective noncatalytic reduction at temperatures above 950° C., comprising:

injecting into the gas stream containing $NO_x$ an aqueous solution comprising both a nitrogenous $NO_x$-reducing agent and at least 1.5% of an inorganic acid phosphate, wherein the $NO_x$-reducing agent comprises an NH-containing composition comprising a member selected from the group consisting of ammonia, urea, carbamates, ammonium carbonate, ammonium bicarbonate, cyanurate, ammonium salts of organic acids and mixtures of these is introduced at a molar ratio of nitrogen in said $NO_x$-reducing agent to the nitrogen as $NO_x$ in the gas stream of from about 0.8 to about 5, and the phosphate comprises a member selected from the group consisting of ammonium phosphates, calcium phosphates, and mixtures thereof with sufficient water solubility to permit their introduction in aqueous solution, and is introduced at a molar ratio of nitrogen in the $NO_x$-reducing agent to phosphorous of from about 50:1 to about 1:2, as a spray of droplets having an average droplet size of from about 5 to about 10,000 microns, containing $NO_x$ to contact with the $NO_x$ in the gas phase and thereby reduce said $NO_x$.

2. A process according to claim 1 wherein the $NO_x$-reducing agent is introduced at a molar ratio of nitrogen in said $NO_x$-reducing agent to the nitrogen as $NO_x$ in the gas stream of from about 1 to about 3.

3. A process according to claim 1 wherein the phosphate is introduced at a molar ratio of nitrogen in the $NO_x$-reducing agent to phosphorous of from about 35:1 to about 4:1.

4. A process according to claim 1 wherein the temperature of the gas stream is greater than about 950° C. at the point of introduction.

5. A process according to claim 1 wherein the temperature of the gas stream is within the range of from about 1000° C. to about 1400° C. at the point of introduction.

6. A process according to claim 1 wherein the phosphate comprises a member selected from the group consisting of monobasic ammonium phosphate ($NH_4H_2PO_4$), dibasic ammonium phosphate (($NH_4)_2HPO_4$), hemibasic ammonium phosphate ($NH_4H_2PO_4 \cdot H_3PO_4$) and mixtures thereof.

7. A process for reducing the concentration of $NO_x$ in an oxygen-rich gas stream containing $NO_x$ at temperatures above 950° C., comprising:

introducing both a nitrogenous $NO_x$-reducing agent comprising an NH-containing composition comprising a member selected from the group consisting of ammonia, urea, carbamates, ammonium carbonate, ammonium bicarbonate, cyanurates, ammonium salts of organic acids and mixtures thereof, and at least 1.5% of a phosphate comprising a member selected from the group consisting of ammonium phosphates, calcium phosphates, and mixtures thereof, with sufficient water solubility to permit their introduction in aqueous solution, into the gas stream at a molar ratio of nitrogen in the $NO_x$-reducing agent to the nitrogen as $NO_x$ in the gas stream of from about 0.8 to about 5 and a molar ratio of nitrogen in the $NO_x$-reducing agent to phosphorous of from about 50:1 to about 1:2.

8. A process according to claim 7 wherein both the $NO_x$-reducing agent and the phosphate are introduced in aqueous solution as a spray of droplets.

9. A process according to claim 8 wherein the $NO_x$-reducing agent is introduced at a molar ratio of nitrogen in said $NO_x$-reducing agent to the nitrogen as $NO_x$ in the gas stream of from about 1 to about 3.

10. A process according to claim 7 wherein the phosphate is introduced at a molar ratio of nitrogen in the $NO_x$-reducing agent to phosphorous of from about 35:1 to about 4:1.

11. A process according to claim 7 wherein the temperature of the gas stream is within the range of from about 1000° C. to about 1400° C. at the point of introduction.

* * * * *